United States Patent
Quiers (10) Patent No.: US 9,031,619 B2
(45) Date of Patent: May 12, 2015

(54) VISUAL INDICATION OF ACTIVE SPEECH RECEPTION

(75) Inventor: Francis Quiers, Basingstoke (GB)

(73) Assignee: Nokia Corporation, Espoo (FI)

(*) Notice: Subject to any disclaimer, the term of this patent is extended or adjusted under 35 U.S.C. 154(b) by 122 days.

(21) Appl. No.: 12/894,275

(22) Filed: Sep. 30, 2010

(65) Prior Publication Data

US 2012/0083318 A1    Apr. 5, 2012

(51) Int. Cl.
| | | |
|---|---|---|
| *H04M 1/00* | (2006.01) | |
| *H04M 1/725* | (2006.01) | |
| *H04W 76/04* | (2009.01) | |
| *H04W 88/02* | (2009.01) | |

(52) U.S. Cl.
CPC ...... *H04M 1/72519* (2013.01); *H04M 2250/56* (2013.01); *H04W 76/048* (2013.01); *H04W 88/02* (2013.01)

(58) Field of Classification Search
CPC ............ H04M 1/72547; H04M 2203/258; H04M 1/2535; H04M 1/6041; H04M 1/7255; H04M 2203/2038; H04M 19/04; H04M 1/72519; H04M 19/041; H04W 68/00; H04W 76/048; H04W 88/02
USPC ............ 455/567, 403, 67.13, 450; 370/352, 370/338; 704/215
See application file for complete search history.

(56) References Cited

U.S. PATENT DOCUMENTS

| | | | |
|---|---|---|---|
| 5,608,794 A | 3/1997 | Larson | |
| 6,224,225 B1 | 5/2001 | Chen | |
| 6,473,529 B1 | 10/2002 | Lin | |
| 2003/0092421 A1* | 5/2003 | Dolwin | 455/403 |
| 2003/0142728 A1* | 7/2003 | Lin | 375/147 |
| 2004/0120474 A1* | 6/2004 | Lopponen et al. | 379/88.17 |
| 2004/0153950 A1* | 8/2004 | Tapaninen et al. | 714/776 |
| 2004/0203463 A1* | 10/2004 | Chen et al. | 455/67.13 |
| 2006/0106598 A1* | 5/2006 | Trombetta et al. | 704/215 |
| 2006/0195576 A1* | 8/2006 | Rinne et al. | 709/226 |
| 2007/0075921 A1* | 4/2007 | Yeager et al. | 345/39 |
| 2007/0129022 A1* | 6/2007 | Boillot et al. | 455/90.1 |
| 2007/0291744 A1* | 12/2007 | Lundberg et al. | 370/352 |
| 2008/0049785 A1* | 2/2008 | Lakaniemi | 370/468 |
| 2008/0131140 A1* | 6/2008 | Shin et al. | 398/172 |
| 2008/0176576 A1* | 7/2008 | Diachina et al. | 455/450 |
| 2008/0186892 A1* | 8/2008 | Damnjanovic | 370/311 |
| 2009/0109942 A1* | 4/2009 | Wijayanathan | 370/338 |

FOREIGN PATENT DOCUMENTS

JP    11-205436 A    7/1999

OTHER PUBLICATIONS

"Altesys Professional Headsets", Product Brochure, Altesys, 32 pgs., 2009.
"Arko Voice Guide Headset With Line Busy Indicator", Product Brochure, Arko Voice, 3 pgs., 2010.

(Continued)

*Primary Examiner* — Nathan Taylor
(74) *Attorney, Agent, or Firm* — Harrington & Smith (57) ABSTRACT

A method includes, during operation of a mobile handset when a voice call is in progress with a remote party, detecting an occurrence of a start of a discontinuous transmission period that results from a cessation of speech by the remote party; and activating a visual indicator of the mobile handset to assume a first state that indicates that a speech signal is not being received from the remote party.

9 Claims, 4 Drawing Sheets

(56) References Cited

OTHER PUBLICATIONS

"Customer Reviews-Plantronics S-12 Corded Telephone Head System", Plantronics, 9 pgs., 2010.
"3rd Generation Partnership Project; Technical Specification Group Services and System Aspects; ANSI-C code for the Adaptive Multi Rate (AMR) speech codec (Release 9)", 3GPP TS 26.073 V9.0.0, 25 pgs., Dec. 2009.
"3rd Generation Partnership Project; Technical Specifiction Group Services and System Aspects; Mandatory speech codec speech processing functions Adaptive Multi-Rate (AMR) speech codec; Source controlled rate operation (Release 9)", 3GPP TS 26.093 V9.0.0, 28 pgs., Dec. 2009.
"Sieve Email Filtering: Reject and Extended Reject Extensions", A Stone, RFC 5429, 14 pgs., Mar. 2009.
"G.7291 RTP Payload Format Update: Discontinuous Transmission (DTX) Support", A. Sollaud, RFC 5429, 7 pgs., Jan. 2009.

* cited by examiner

VISUAL INDICATION OF ACTIVE SPEECH RECEPTION

TECHNICAL FIELD

The exemplary and non-limiting embodiments of this invention relate generally to wireless communication systems, methods, devices and computer programs and, more specifically, relate to human-perceptible telephone call state indicators.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

When a user ('A') of a mobile communication device, e.g., a mobile phone, is engaged in a voice call, the person ('B') at the other end of the call is not always actively speaking. For example, 'B' might briefly pause to think of a response to a question or to search for a piece of information that is required to proceed with the conversation. In this case, and if 'A' is also not speaking at this particular time, a person 'C' in proximity to 'A', who might wish to communicate orally with 'A', for example to draw the attention of 'A' to another piece of information that might be valuable for the on-going telephone conversation, cannot easily understand that they have an opportunity to do so unless 'A' has set the mobile phone into a loudspeaker mode (if supported). That is, the person 'C', who can readily ascertain that person 'A' is not currently speaking, cannot readily ascertain that the person 'B' is currently also not speaking, i.e., that there is a temporary lull in the conversation during which it may be acceptable and useful to interact with person 'A'.

SUMMARY

The foregoing and other problems are overcome, and other advantages are realized, in accordance with the exemplary embodiments of this invention.

In a first aspect thereof the exemplary embodiments provide a method that comprises, during operation of a mobile handset when a voice call is in progress with a remote party, detecting an occurrence of a start of a discontinuous transmission period that results from a cessation of speech by the remote party; and activating a visual indicator of the mobile handset to assume a first state that indicates that a speech signal is not being received from the remote party.

In another aspect thereof the exemplary embodiments provide an apparatus that comprises at least one processor and at least one memory including computer program code. The at least one memory and computer program code are configured to, with the at least one processor, cause the apparatus, during operation of a mobile handset when a voice call is in progress with a remote party, to detect an occurrence of a start of a discontinuous transmission period that results from a cessation of speech by the remote party; and to activate a visual indicator of the mobile handset to assume a first state that indicates that a speech signal is not being received from the remote party.

In a further aspect thereof the exemplary embodiments provide a non-transitory computer-readable medium that contains software program instructions, where execution of the software program instructions by at least one data processor results in performance of operations that comprise, during operation of a mobile handset when a voice call is in progress with a remote party, detecting an occurrence of a start of a discontinuous transmission period that results from a cessation of speech by the remote party; and activating a visual indicator of the mobile handset to assume a first state that indicates that a speech signal is not being received from the remote party.

In yet another aspect thereof the exemplary embodiments provide an apparatus that comprises means, responsive to operation of a telephone when a voice call is in progress with a remote party, for detecting an occurrence of a start of a discontinuous transmission period that results from a cessation of speech by the remote party, and means for activating a visual indicator of the telephone, or a visual indicator of a unit associated with the telephone, to assume a first state that indicates that a speech signal is not being received from the remote party. In the apparatus the visual indicator is located so as to be visible to a person in proximity to the telephone when the telephone is being used by a user during the voice call. In the apparatus the detecting means is further operable for detecting an occurrence of an end of the discontinuous transmission period, and the activating means is further operable for activating the visual indicator to assume a second state that indicates that a speech signal is being received from the remote party.

BRIEF DESCRIPTION OF THE DRAWINGS

The foregoing and other aspects of the exemplary embodiments of this invention are made more evident in the following Detailed Description, when read in conjunction with the attached Drawing Figures, wherein.

DETAILED DESCRIPTION

The exemplary embodiments of this invention pertain at least in part to telephony, such as telephony carried out using a mobile phone, and in particular to various phases of a voice call when the persons participating in a conversation are not actively speaking.

The exemplary embodiments provide, in one aspect thereof, an external visual indication on a mobile phone handset that the remote party to a conversation ('B' in the example given above) is not actively speaking, without requiring any active involvement from 'A'.

Figure 1:
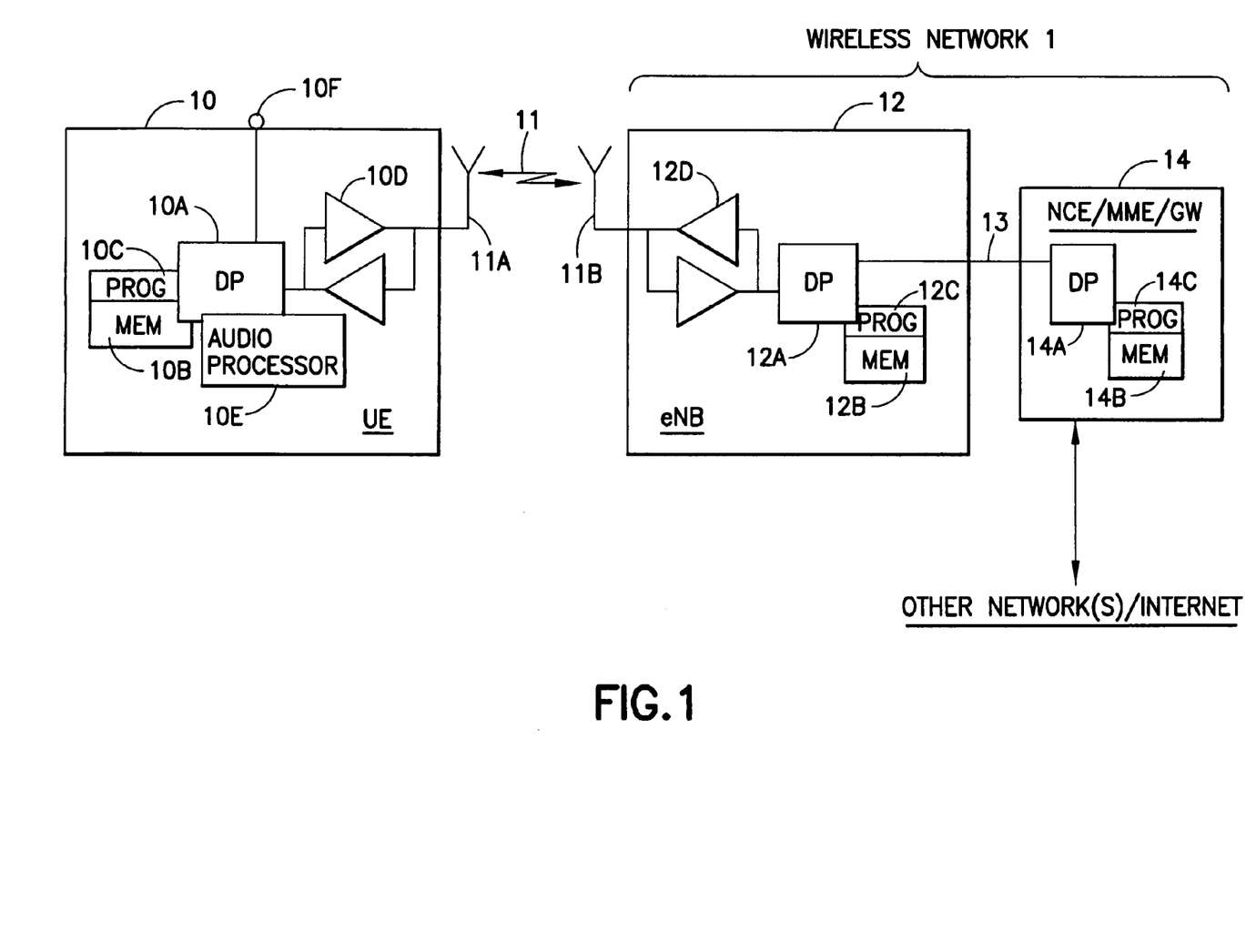
FIG. 1 is a simplified block diagram of a user equipment wirelessly connected with a base station.

Before describing in further detail the exemplary embodiments of this invention, reference is made to FIG. 1 for illustrating a simplified block diagram of various electronic devices and apparatus that are suitable for use in practicing the exemplary embodiments of this invention. In FIG. 1 a wireless network 1 is adapted for communication over a wireless link 11 with an apparatus, such as a mobile communication device which may be referred to without a loss of generality as a mobile handset, a mobile phone, a mobile station, a mobile terminal, or as a user equipment (UE) 10. Communication occurs via a network access node or access point which may be referred to without a loss of generality as a Node B, an evolved Node B, or simply as a base station (BS) 12. The network 1 may include some type of network control element (NCE) 14 that may include, for example, a mobility management entity and/or a gateway (GW) that provides connectivity with a further network, such as a telephone network and/or a data communications network (e.g., the internet). The UE 10 includes a controller, such as at least one computer or a data processor (DP) 10A, at least one non-transitory computer-readable memory medium embodied as a memory (MEM) 10B that stores a program of computer instructions (PROG) 10C, and at least one suitable radio frequency (RF) transmitter and receiver pair (transceiver) 10D for bidirectional wireless communications with the BS via one or more antennas 11A. The BS 12 also includes a controller, such as at least one computer or a data processor (DP) 12A, at least one computer-readable memory medium embodied as a memory (MEM) 12B that stores a program of computer instructions (PROG) 12C, and at least one suitable RF transceiver 12D for communication with the UE 10 via one or more antennas 11B (typically several when multiple input/multiple output (MIMO) operation is in use). The BS 12 is coupled via a data/control path 13 to the NCE 14 that can also be assumed to include a controller, such as at least one computer or a data processor (DP) 14A, and at least one computer-readable memory medium embodied as a memory (MEM) 14B that stores a program of computer instructions (PROG) 14C. Of particular interest to the exemplary embodiments is the program 10C of the UE 10.

For the purposes of describing the exemplary embodiments of this invention the UE 10 may be assumed to also include an audio processor section or subsystem 10E and some type of visual indicator 10F such as, but not limited to, a light emitting diode (LED).

At least the PROG 10C is assumed to include program instructions that, when executed by the associated DP 10A, enable the device to operate in accordance with the exemplary embodiments of this invention, as will be discussed below in greater detail. That is, the exemplary embodiments of this invention may be implemented at least in part by computer software executable by the DP 10A of the UE 10, or by hardware, or by a combination of software and hardware (and firmware).

In general, the various embodiments of the UE 10 can include, but are not limited to, cellular telephones, personal digital assistants (PDAs) having wireless voice communication capabilities, portable computers having wireless voice communication capabilities, gaming devices having wireless voice communication capabilities, music storage and playback appliances having wireless voice communication capabilities, Internet appliances permitting wireless Internet access and browsing as well as wireless voice communication capabilities, as well as portable units or terminals that incorporate combinations of such functions.

The computer-readable memory 10B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The DP 10A may be of any type suitable to the local technical environment, and may include one or more of general purpose computers, special purpose computers, microprocessors, digital signal processors (DSPs) and processors based on multi-core processor architectures, as non-limiting examples. In practice there may be a plurality of data processors, each responsible for some aspect of the operation of the UE 10.

The exemplary embodiments of this invention provide a method, apparatus and computer program to notify a person in the proximity of the user of the UE 10, when engaged in a voice call with a remote party, whether the person at the other end of the call (the remote party) is actively speaking, hence providing the person with an indication of the times when it may be appropriate to speak to the user of the UE 10.

Figure 2:
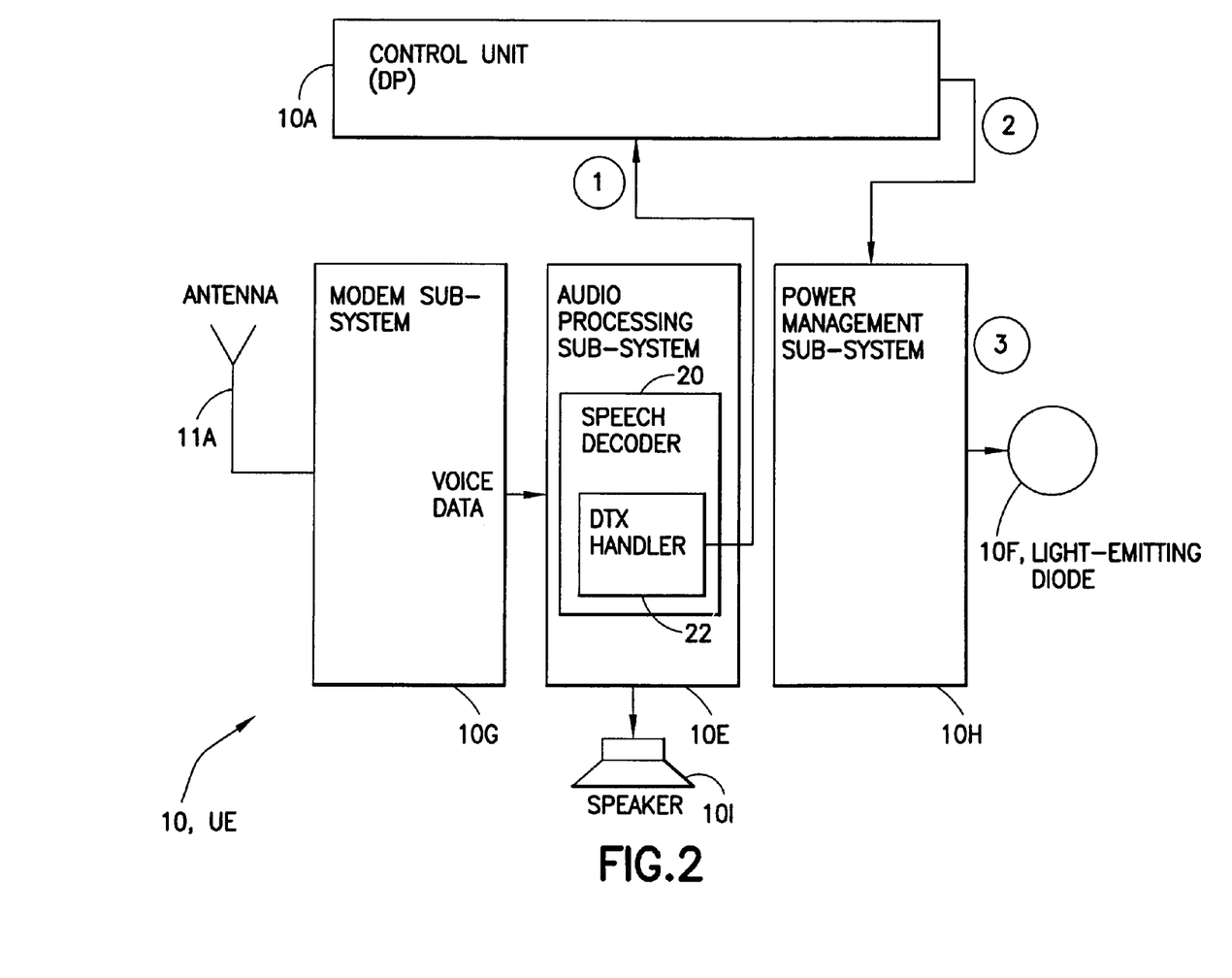
FIG. 2 is a more detailed block diagram of the user equipment of FIG. 1.

Referring also to FIG. 2, the exemplary embodiments, in one non-limiting implementation, make use of Discontinuous Transmission (DTX) information from a receiving (modem) sub-system 10G of the UE 10 to drive the activation of the visual indicator 10F to indicate the DTX state (speech or non-speech). The DTX information can be communicated via the audio processor 10E to a control unit, e.g., to the DP 10A, that in turn activates by some means, such as by a power management sub-system 10H, the visual component (e.g., LED) 10F during periods of received speech, and deactivates it otherwise. The audio processing sub-system 10E can be seen to include a speech decoder 20 and an associated DTX handler 22. Control data/command paths to accomplish the activation and deactivation of the visual indicator 10F are labeled as (1), from the DTX handler 22 to the control unit 10A, (2), from the control unit 10A to the power management sub-system 10H, and (3), from the power management sub-system 10H to the visual indicator 10F.

Minimizing co-channel interference is desirable in a cellular radiocommunication system as it allows improved service for a given cell size, or the use of smaller cells, thus increasing the overall capacity of the system. DTX is a method that takes advantage of the fact that a person speaks less that 40 percent of the time, in normal conversation, by turning the transmitter of the mobile handset off during silence periods. This also serves to reduce power consumption and extend battery life. To achieve DTX some type of voice activity detection (VAD) is used at the transmitter side to distinguish between voice and noise inputs (e.g., background noise). Another factor to consider is that when the transmitter of the mobile handset is turned off then total silence is "heard" at the receiving end, due to the digital nature of modern cellular communications networks such as GSM and the long term evolution of UTRAN (eUTRAN, evolved UMTS terrestrial radio access network). To assure the receiver that the connection is not lost 'comfort noise' is created at the receiving end by attempting to match the characteristics of the background noise at the transmitter.

Figure 4:
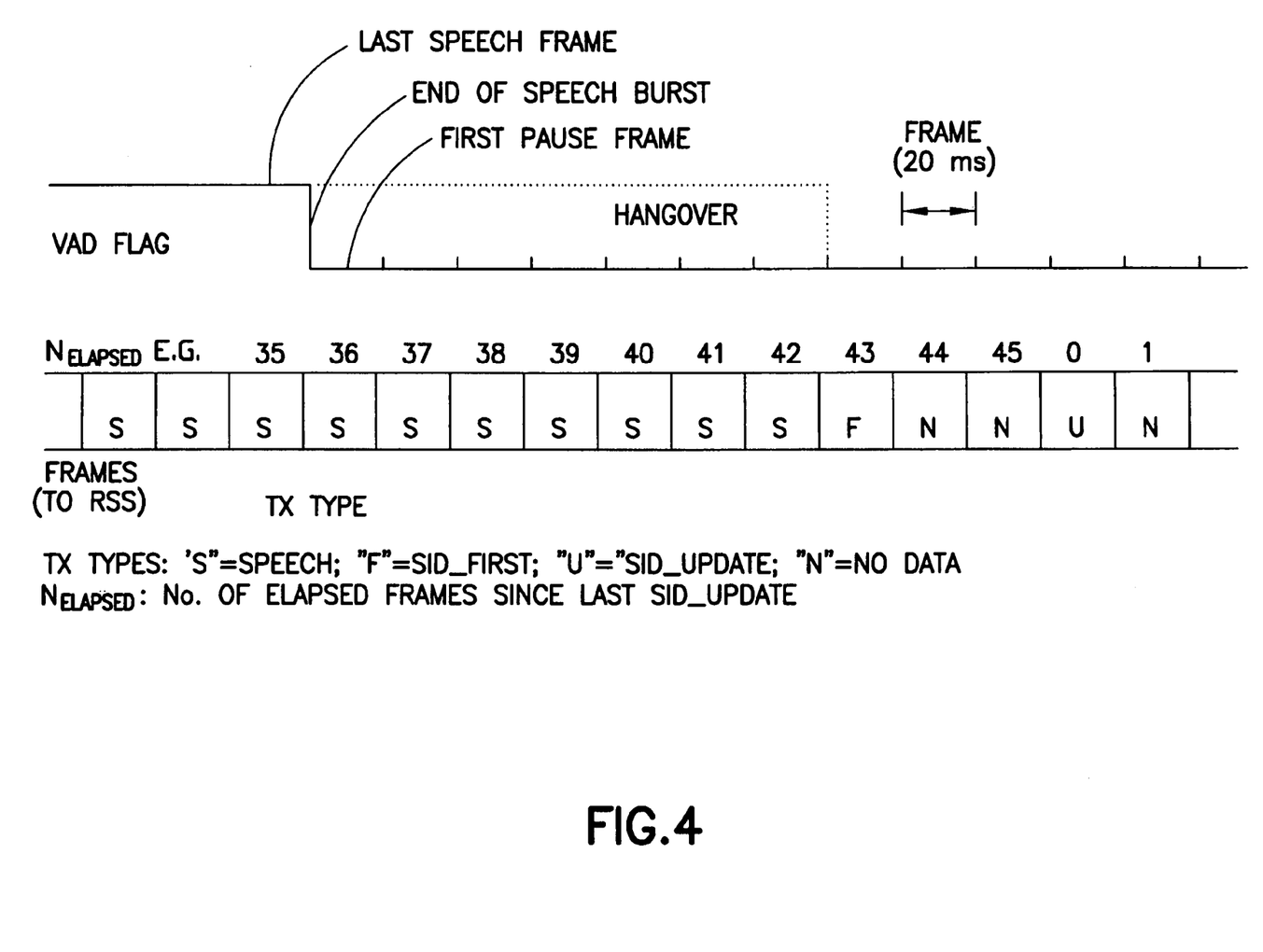
FIG. 4 reproduces FIG. 6 in section A.5.1.1, entitled "Functions of the TX DTX handler", of 3GPP TS 26.093 V9.0.0, and is useful for showing various concepts pertaining to DTX operation.

General reference with regard to DTX operation may be made, for example, to 3GPP TS 26.093 V9.0.0 (2009-12) Technical Specification 3rd Generation Partnership Project; Technical Specification Group Services and System Aspects; Mandatory speech codec speech processing functions Adaptive Multi-Rate (AMR) speech codec; Source controlled rate operation (Release 9). FIG. 4 herein reproduces FIG. 6 in section A.5.1.1, entitled "Functions of the TX DTX handler", of 3GPP TS 26.093 V9.0.0 and shows a normal hangover procedure used with consecutive speech frames of 20 millisecond duration. In FIG. 4 SID refers to silence descriptor and RSS refers to radio sub-system. The hangover period is defined in the non-limiting AMR embodiment as a period of seven frames added at the end of speech burst in which the VAD flag (which indicates the presence or absence of a speech frame) is equal to zero, and the TX_TYPE is SPEECH.

During an active voice call configured to use DTX several software and/or hardware components of the UE 10 contain a representation of the state of the received audio (speech/non-speech). The representations can be stored as software variable(s) in the memory 10B and/or in one or more hardware registers. In particular, once the modem sub-system 10G has decoded the signal received originally from the antenna 11A, including the information about the speech/non-speech state, it transfers the encoded audio data as well as the speech state control information to the speech decoder 20. The speech decoder 20 is typically responsible for decoding the encoded audio stream into pulse code modulated (PCM) speech data. At certain times (e.g., between spoken words and phrases, and during pauses in conversation) the encoded audio stream can include the so-called 'comfort noise'. During these times the speech decoder 20 generates comfort noise PCM data. The actual speech and the comfort noise are eventually rendered as sound waves, for example by means of a digital to analog converter (DAC, not shown) and an audio transceiver (earpiece or headset for example, shown generically as a loudspeaker 10I).

In the case of the software adaptive multi-rate (AMR) speech decoder 20, for example, the speech state information is typically reflected in at least one software variable of the DTX handler 22. The software variable can have at any given time one of three possible values, one of them reflecting that active speech is being received, and two of them reflecting periods of inactive speech. For example, in the C-language implementation from 3GPP TS 26.073 V9.0.0 (2009-12) Technical Specification 3rd Generation Partnership Project; Technical Specification Group Services and System Aspects; ANSI-C code for the Adaptive Multi Rate (AMR) speech codec (Release 9), a variable shown in Table 8 "Speech decoder static variables" is referred to as dtxGlobalState (defined as DTX state flags). At any given time this variable can only take one of the three enumerated values: SPEECH, DTX or DTX_MUTE.

Figure 3:
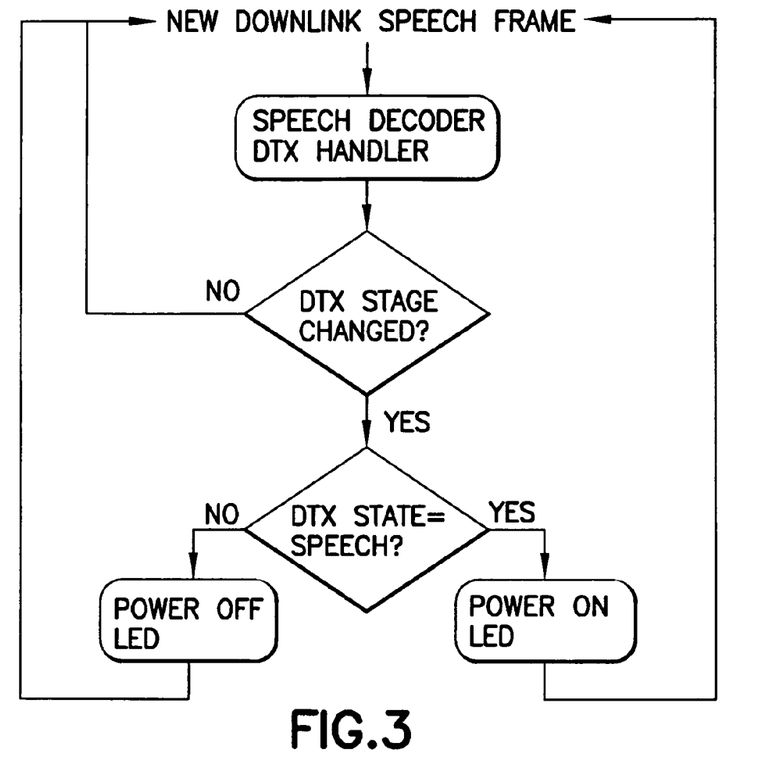
FIG. 3 illustrates a decision process in the form of a flowchart that executes in response to received downlink encoded speech frames.

In one exemplary and non-limiting embodiment the DTX handler 22 reports the state of the dtxGlobalState variable to the control unit 10A (over control path (1)) each time this variable changes state. In response the control unit 10A turns power on (activates) or off (de-activates) to the visual indicator 10F (e.g., LED). For example, a red-color LED could, for example, be powered on upon a change from non-SPEECH to SPEECH state, and back off again upon a change from SPEECH to non-SPEECH state. Further by example, a green-color LED could, for example, be powered on upon a change from SPEECH to non-SPEECH state, and back off again upon a change from the non-SPEECH to the SPEECH state. FIG. 3 illustrates a corresponding simple decision process in the form of a flowchart that executes in response to received downlink (BS 12 to UE 10) AMR speech frames.

In another exemplary embodiment the speech/non-speech state of the received signal from the modem sub-system 10G itself can be used, which also contains a representation of the DTX state. However, this embodiment may be less reliable than using the information from the speech decoder 20, which derives its own state from additional logic based on audio processing techniques, unlike the modem sub-system 10G which only uses radio channel decoding techniques.

In a further exemplary embodiment a threshold mechanism can be used to only report changes between the SPEECH and non-SPEECH state if a certain threshold number of speech frames (representing some predetermined period of time) of the same type is exceeded, so as not to drive the powering on and off of the LED 10F at too high a frequency. The same can be done for the opposite transition (non-SPEECH to SPEECH), however this could result in a delay in the powering on of the LED 10F, and in turn give the impression to the person in proximity to the UE 10 that the person has an opportunity to speak to the user, while in fact the attention of the user is already focused on the phone conversation which just resumed. The use of some predetermined number of speech frames before triggering an activation of the visual indicator 10F thus provides some degree of hysteresis.

As opposed to the use of the LED as the visual indicator 10F another type of visual indicator component can be used. For example, an icon on a display of the UE 10 could be used, although this might be less convenient because it could be more difficult for the person other than the user of the UE 10 to observe, in particular if the user is holding the UE 10 in a handportable mode and the display screen is totally or partially hidden from the person in proximity to the user. In addition, this approach may require that the full display stay powered on for longer periods, hence possibly consume more energy than consumed by the LED.

As another alternative embodiment a color-changing material could be used for part or all of the external cover/casing of the UE 10, for example an electrochromic back cover, which would assume a different color when speech is being received as opposed to non-speech.

As another alternative embodiment the visual indicator 10F (or a second visual indicator) could be located with/on an accessory (peripheral unit) that is attached (physically and/or logically) to the UE 10. For example, the visual indicator 10F could be associated with wired or wireless headphones, or with a microphone supported by a boom in front of the user's mouth.

In some cases it might be desirable to maintain the visual indicator 10F in the state that represents active speech reception for the entire duration of the call, such as in a case where the call is established without making use of DTX.

Based on the foregoing it should be apparent that the exemplary embodiments of this invention provide a method, apparatus and computer program(s) to improve upon the problematic situation described above by offering a simple means to passively notify a person in the proximity of a mobile handset user when the other party to a voice call is not actively speaking, thereby giving the person an opportunity to speak to or otherwise interact with the user of the mobile handset (UE 10) should the person wish to do so.

Figure 5:
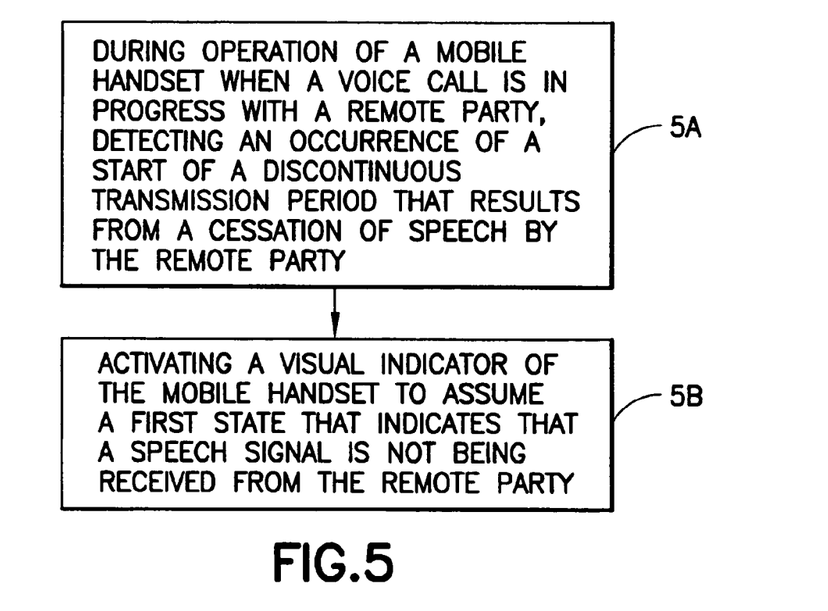
FIG. 5 is a logic flow diagram that illustrates the operation of a method, and a result of execution of computer program instructions, in accordance with the exemplary embodiments of this invention.

FIG. 5 is a logic flow diagram that illustrates the operation of a method, and a result of execution of computer program instructions, in accordance with the exemplary embodiments of this invention. In accordance with these exemplary embodiments a method performs at step, at Block 5A, during operation of a mobile handset when a voice call is in progress with a remote party, of detecting an occurrence of a start of a discontinuous transmission period that results from a cessation of speech by the remote party. At Block 5B there is a step of activating a visual indicator of the mobile handset to assume a first state that indicates that a speech signal is not being received from the remote party.

In the method as in FIG. 5, where detecting an occurrence of the start of the discontinuous transmission period comprises detecting in the mobile handset a change of state of a speech codec variable associated with discontinuous transmission operation of the speech codec.

In the method as in FIG. 5 and the preceding paragraphs, where activating occurs after some predetermined period of time from detecting the occurrence of the start of the discontinuous transmission period.

In the method as in FIG. 5 and the preceding paragraphs, and further comprising during operation of the mobile handset when the voice call is in progress with the remote party, detecting an occurrence of an end of the discontinuous transmission period and activating the visual indicator of the mobile handset to assume a second state that indicates that a speech signal is being received from the remote party.

In the method as in FIG. 5 and the preceding paragraphs, where the visual indicator is located on the mobile handset, or on a peripheral unit associated with the mobile handset, so as to be visible to a person in proximity to the mobile handset when the mobile handset is being used by a user during the voice call.

Also disclosed is a non-transitory computer-readable medium that contains software program instructions, where execution of the software program instructions by at least one data processor of the mobile handset results in performance of operations that comprise execution of the method of FIG. 5 and the preceding several paragraphs.

The various blocks shown in FIG. 5 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of DTX operation of the AMR speech codec system, it should be appreciated that the exemplary embodiments of this invention are not limited for use with only this one particular type of speech codec, and that they may be used to advantage with other types of speech codecs in other types of wireless communication systems. Further, the actual form of the visual indicator 10F should not be construed as being limited to only a LED, or an icon on a visual display, or an electrochromic surface material, as any type of component (e.g., a gas discharge bulb) capable of generating a visually perceptible output can be used.

Further, it should be appreciated that the exemplary embodiments of this invention can be used with any type of packet switched type of call, including voice over internet protocol (VoIP) types of calls, wherein the speech codec (e.g., a G.729 type of speech codec) provides a DTX functionality Reference in this regard can be made to, for example, RFC 5429, "G.729.1 RTP Payload Format Update: Discontinuous Transmission (DTX) Support", A. Sollaud, France Telecom, January 2009 . Note also in this regard that the exemplary embodiments are not limited for use with only a wireless communication system, as a non-wireless or at least a partially non-wireless communication system can benefit from the use of the exemplary embodiments (e.g., a telecommunication system that provides VoIP calling between two or more desktop telephones).

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters and modes of operation (e.g., DTX, VAD, etc.) are not intended to be limiting in any respect, as these parameters and modes of operations may be identified by any suitable names, as may any DTX-related software variables and data elements.

In addition, the exemplary embodiments have been described at least in part in the context of activating a visual indicator to assume a state that indicates that a speech signal is not being received from the remote party. It should be appreciated that in this context "activating" may mean applying power to the visual indicator, or otherwise turning it on, so that it is illuminated, or "activating" may mean removing power from the visual indicator, or otherwise turning it off, so that it is not illuminated. As such, "deactivating" the visual indicator would imply the opposite action (e.g., removing power and applying power, respectively). Further, while it may be desirable to arrange the visual indicator to be illuminated (or on) when the remote party is speaking, and not illuminated (or off) otherwise, the exemplary embodiments of this invention also encompass the opposite case where the visual indicator is not illuminated (is off) when the remote party is speaking and is illuminated (or on) otherwise.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   during operation of a mobile handset when a voice call is in progress with a remote party, detecting an occurrence of a start of a discontinuous transmission period that results from a cessation of speech by the remote party;
   activating a visual indicator of the mobile handset to assume a first state that indicates that a speech signal is not being received from the remote party;
   activating the visual indicator to assume a second state that indicates that a speech signal is being received from the remote party; and
   during operation of the mobile handset when the voice call is in progress with the remote party, detecting an occurrence of an end of the discontinuous transmission period;
   wherein the visual indicator is located on the mobile handset, or on a peripheral unit associated with the mobile handset, so as to provide an indication to a non-user in proximity to the mobile handset in response to the receiving of the speech signal from the remote party; and
   wherein detecting the occurrence of the start of the discontinuous transmission period comprises detecting in the mobile handset a change of state of a speech codec associated with discontinuous transmission operation of the speech codec.

2. The method of claim 1, where activating occurs after some predetermined period of time from detecting the occurrence of the start of the discontinuous transmission period.

3. An apparatus, comprising:
   at least one processor; and
   at least one memory including computer program code, where the at least one memory and computer program code are configured to, with the at least one processor, cause the apparatus, during operation of a mobile handset when a voice call is in progress with a remote party:
   to detect an occurrence of a start of a discontinuous transmission period that results from a cessation of speech by the remote party;
   to activate a visual indicator of the mobile handset to assume a first state that indicates that a speech signal is not being received from the remote party;
   to activate the visual indicator to assume a second state that indicates that a speech signal is being received from the remote party; and
   during operation of the mobile handset when the voice call is in progress with the remote party, to detect an occurrence of an end of the discontinuous transmission period;
   wherein the visual indicator is located on the mobile handset, or on a peripheral unit associated with the mobile handset, so as to provide an indication to a non-user in proximity to the mobile handset in response to the receiving of the speech signal from the remote party; and
   wherein detecting the occurrence of the start of the discontinuous transmission period comprises detecting in the mobile handset a change of state of a speech codec associated with discontinuous transmission operation of the speech codec.

4. The apparatus of claim 3, where activating occurs after some predetermined period of time from detecting the occurrence of the start of the discontinuous transmission period.

5. A non-transitory computer-readable medium that contains software program instructions, where execution of the software program instructions by at least one data processor results in performance of operations that comprise:
   during operation of a mobile handset when a voice call is in progress with a remote party, detecting an occurrence of a start of a discontinuous transmission period that results from a cessation of speech by the remote party;
   activating a visual indicator of the mobile handset to assume a first state that indicates that a speech signal is not being received from the remote party;
   activating the visual indicator to assume a second state that indicates that a speech signal is being received from the remote party; and
   during operation of the mobile handset when the voice call is in progress with the remote party, detecting an occurrence of an end of the discontinuous transmission period;
   wherein the visual indicator is located on the mobile handset, or on a peripheral unit associated with the mobile handset, so as to provide an indication to a non-user in proximity to the mobile handset in response to the receiving of the speech signal from the remote party; and
   wherein detecting the occurrence of the start of the discontinuous transmission period comprises detecting in the mobile handset a change of state of a speech codec associated with discontinuous transmission operation of the speech codec.

6. The non-transitory computer-readable medium of claim 5, where activating occurs after some predetermined period of time from detecting the occurrence of the start of the discontinuous transmission period.

7. An apparatus, comprising:
   at least one processor, and at least one memory including computer program code; the at least one memory and the computer program code configured, with the at least one processor, to cause the apparatus to perform at least the following:
   responsive to operation of a telephone when a voice call is in progress with a remote party, detecting an occurrence of a start of a discontinuous transmission period that results from a cessation of speech by the remote party, wherein detecting the occurrence of the start of the discontinuous transmission period comprises detecting in the telephone a change of state of a speech codec associated with discontinuous transmission operation of the speech codec;
   activating a visual indicator of the telephone, or a visual indicator of a unit associated with the telephone, to assume a first visible state that indicates that a speech signal is not being received from the remote party, where said visual indicator is located so as to provide an indication to a non-user in proximity to the telephone in response to the telephone being used by a user during the voice call; and
   during operation of the telephone when the voice call is in progress with the remote party, detecting an occurrence of an end of the discontinuous transmission period and activating the visual indicator to assume a second visible state that indicates that the speech signal is being received from the remote party based on the receiving of the speech signal from the remote party by the telephone in response to the telephone being used by the user during the voice call.

8. The apparatus as in claim 7, where said activating delays some period of time after said detecting detects the occurrence of the start of the discontinuous transmission period before activating the visual indicator.

9. The apparatus as in claim 7 configured to operate with a packet-switched type of voice call, including a voice over interne protocol type of voice call.

\* \* \* \* \*

UNITED STATES PATENT AND TRADEMARK OFFICE
CERTIFICATE OF CORRECTION

PATENT NO. : 9,031,619 B2  Page 1 of 1
APPLICATION NO. : 12/894275
DATED : May 12, 2015
INVENTOR(S) : Quiers It is certified that error appears in the above-identified patent and that said Letters Patent is hereby corrected as shown below:

In the Claims

In Claim 9, Column 11, line 3 delete "interne" and replace with --internet--.

Signed and Sealed this
Twenty-first Day of July, 2015

Michelle K. Lee
*Director of the United States Patent and Trademark Office*